United States Patent
Shveidel et al.

(10) Patent No.: US 11,144,252 B2
(45) Date of Patent: Oct. 12, 2021

(54) OPTIMIZING WRITE IO BANDWIDTH AND LATENCY IN AN ACTIVE-ACTIVE CLUSTERED SYSTEM BASED ON A SINGLE STORAGE NODE HAVING OWNERSHIP OF A STORAGE OBJECT

(71) Applicant: EMC IP Holding Company LLC, Hopkinton, MA (US)

(72) Inventors: Vladimir Shveidel, Pardes-Hana (IL); Ronen Gazit, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 7 days.

(21) Appl. No.: 16/738,405

(22) Filed: Jan. 9, 2020

(65) Prior Publication Data
US 2021/0216213 A1   Jul. 15, 2021

(51) Int. Cl.
*G06F 13/00* (2006.01)
*G06F 3/06* (2006.01)
*H04L 29/08* (2006.01)

(52) U.S. Cl.
CPC ............ *G06F 3/067* (2013.01); *G06F 3/0619* (2013.01); *G06F 3/0688* (2013.01); *H04L 67/1002* (2013.01); *H04L 67/1097* (2013.01)

(58) Field of Classification Search
CPC ...... G06F 3/067; G06F 3/0619; G06F 3/0688; H04L 67/1002; H04L 67/1097
See application file for complete search history.

(56) References Cited

U.S. PATENT DOCUMENTS

| | | | |
|---|---|---|---|
| 6,247,099 B1* | 6/2001 | Skazinski | G06F 12/0815 711/117 |
| 6,405,274 B1* | 6/2002 | Chan | G06F 9/52 707/999.008 |
| 9,430,343 B1 | 8/2016 | Michael et al. | |
| 10,503,429 B2 | 12/2019 | Mikhail et al. | |
| 2003/0187927 A1* | 10/2003 | Winchell | G06F 11/1425 709/204 |

(Continued)

OTHER PUBLICATIONS

Shveidel, et al.; "Performance Optimization for Active-Active Locking Using Sticking Affinity for Storage Objects," U.S. Appl. No. 16/520,510, filed Jul. 24, 2019.

*Primary Examiner* — Jing-Yih Shyu
(74) *Attorney, Agent, or Firm* — BainwoodHuang

(57) ABSTRACT

Techniques for optimizing write IO bandwidth and latency in an active-active clustered system using storage object affinity to a single node. The active-active clustered system can include at least a primary storage node and a secondary storage node that maintain their own journals. The respective journals are directly accessible to both storage nodes. The journals are synchronized for each page or entity of a storage object when a storage IO request is issued to a storage node to which the storage object does not have affinity. Such synchronization is performed in the framework of acquiring a lock on the entity of the storage object during internode communications. To facilitate recovery from a disaster, data loss, and/or data corruption, transaction IDs associated with storage IO operations are employed to facilitate identification of the most up-to-date reference or description information for a given data or metadata page of a storage object.

17 Claims, 3 Drawing Sheets

(56) References Cited

U.S. PATENT DOCUMENTS

| | | | |
|---|---|---|---|
| 2004/0117580 A1* | 6/2004 | Wu | G06F 11/2097 |
| | | | 711/170 |
| 2006/0173851 A1* | 8/2006 | Singh | G06F 21/6218 |
| 2008/0005470 A1* | 1/2008 | Davies | G06F 3/0617 |
| | | | 711/114 |
| 2011/0161540 A1* | 6/2011 | Chang | G06F 9/526 |
| | | | 710/200 |
| 2013/0339786 A1* | 12/2013 | Samanta | G06F 11/2089 |
| | | | 714/6.23 |
| 2018/0060236 A1* | 3/2018 | Choudhary | G06F 11/34 |
| 2019/0075084 A1* | 3/2019 | Ding | H04L 63/0281 |
| 2019/0303017 A1 | 10/2019 | Lecrone et al. | |
| 2019/0354286 A1 | 11/2019 | Jaeyoo et al. | |
| 2020/0133773 A1* | 4/2020 | Lingarajappa | G06F 3/0619 |

\* cited by examiner

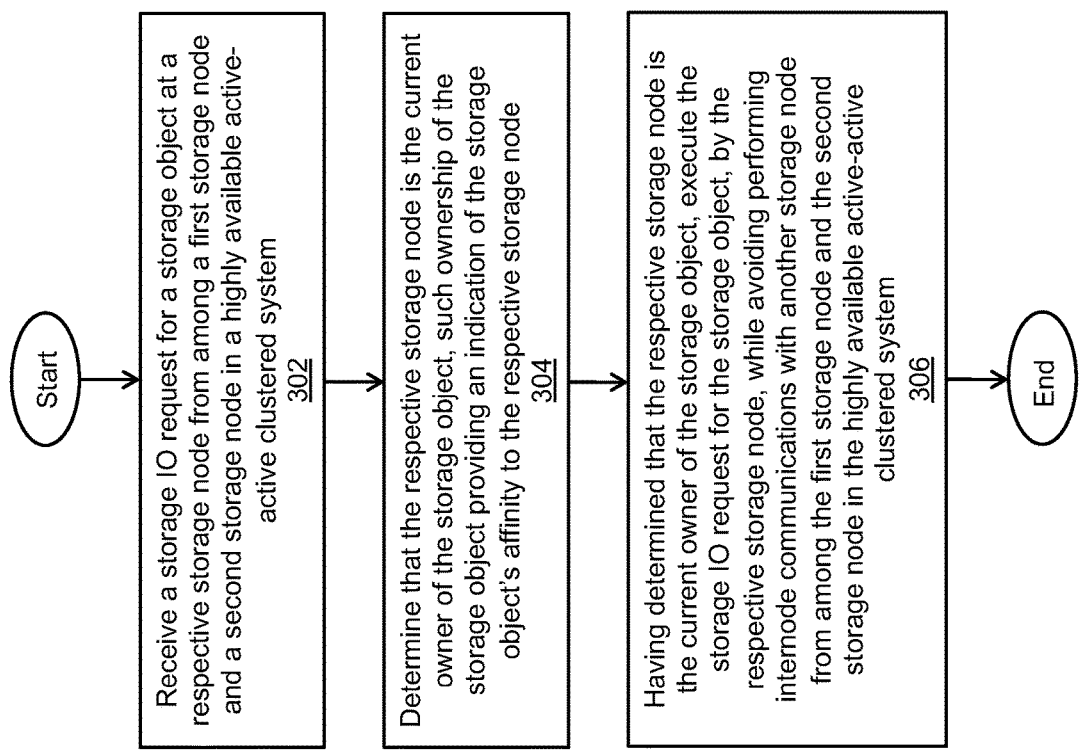

OPTIMIZING WRITE IO BANDWIDTH AND LATENCY IN AN ACTIVE-ACTIVE CLUSTERED SYSTEM BASED ON A SINGLE STORAGE NODE HAVING OWNERSHIP OF A STORAGE OBJECT

BACKGROUND

Active-active clustered systems enable multiple data storage processors (also referred to herein as "data storage nodes" or "storage nodes") in high availability clusters to simultaneously have read-write input/output (IO) access to the same storage objects (e.g., volumes, logical units (LUs), file systems) or other shared resources. Active-active clustered systems employ locks to control and synchronize access to such storage objects. Each such lock is associated with a logical block address (LBA) of a storage object, a physical block address (PBA) of a storage object, a range of addresses of a storage object, or other entity of the storage object. Before writing/reading data of a write/read IO operation to/from a particular address or range of addresses of a storage object, a first storage node in an active-active clustered system obtains a lock(s) for exclusive access to the particular address or range of addresses. If another storage node in the active-active clustered system currently holds the lock(s) for the particular address or range of addresses of the storage object, then the first storage node obtains the lock(s) from the other storage node to enable it to write/read the data of the write/read IO operation to/from the particular address or range of addresses.

SUMMARY

In an active-active clustered system, the performance of read-write input/output (IO) operations generally involves varying amounts of internode communications. For example, to obtain a lock associated with an entity of a storage object that is currently held by another storage node, a first storage node typically communicates a request for the lock to the other storage node and waits for the other storage node to respond to the request. The first storage node may also wait for any outstanding writes to the storage object to be communicated and synchronized between the respective storage nodes before performing a read-write IO operation on the storage object. However, the amounts of internode communications required to obtain a lock and/or synchronize outstanding writes to a storage object can result in latency, significantly degrading the performance of the active-active clustered system.

Techniques are disclosed herein for optimizing write IO bandwidth and latency in an active-active clustered system using storage object affinity to a single storage node. In the disclosed techniques, the active-active clustered system can include at least a primary storage node, and a secondary storage node communicably connected to the primary storage node. Upon receipt of a first storage IO request for a storage object at the primary storage node from a host computer, the primary storage node can determine whether it is the current owner of the storage object. Having determined that it is the current owner of the storage object, the primary storage node can independently set a local lock on an entity associated with the storage object, without engaging in internode communications with the secondary storage node. Further, the primary storage node can allocate space from a directly accessible buffer for a log or journal and execute the first storage IO request for the storage object, logging or writing page reference or description information pertaining to the first storage IO request to the allocated log or journal space. Once the page reference or description information for the first storage IO request is logged or written to the log or journal of the primary storage node, the primary storage node can send an acknowledgement message to the host computer and release the lock on the entity associated with the storage object.

Upon receipt of a second storage IO request for the storage object at the secondary storage node, the secondary storage node can determine whether it is the current owner of the storage object. Having determined that it is not the current owner of the storage object, but, rather, the primary storage node is the current owner, the secondary storage node can engage in internode communications with the primary storage node to obtain a lock on an entity associated with the storage object, and to update and/or synchronize the page reference information contained in the log or journal of the primary storage node with corresponding page reference information contained in log or journal space of its own directly accessible buffer. The secondary storage node can also engage in internode communications with the primary storage node to transfer the ownership of the storage object from the primary storage node to the secondary storage node after a predetermined number of consecutive storage IO requests for the storage object have been issued to the secondary storage node, or at any other suitable time. Having obtained the lock for the storage object and updated and/or synchronized the page reference information contained in the respective logs or journals, the secondary storage node can execute the second storage IO request for the storage object, logging or writing page reference or description information pertaining to the second storage IO request to the log or journal space of its directly accessible buffer. Once the page reference or description information for the second storage IO request is logged or written to the log or journal of the secondary storage node, the secondary storage node can send an acknowledgement message to the host computer and release the lock on the entity associated with the storage object.

By deferring internode communications in an active-active clustered system when storage IO requests for storage objects are received at storage nodes to which the storage objects have affinity (such affinity being based at least on the current ownership of the storage objects), and engaging in internode communications when storage IO requests for storage objects are received at storage nodes to which the respective storage objects do not have such affinity, latency and cycles per byte (CPB) processing can be reduced and storage IO operations per second (IOPS) can be increased in the active-active clustered system.

In certain embodiments, a method of executing a storage IO request for a storage object that has affinity to a storage node includes receiving the storage IO request for the storage object at a respective storage node from among a first storage node and a second storage node in a highly available active-active clustered system, in which the second storage node is communicably connected to the first storage node. The method further includes determining that the respective storage node is a current owner of the storage object, in which such ownership of the storage object provides an indication of an affinity of the storage object to the respective storage node. The method further includes, having determined that the respective storage node is the current owner of the storage object, executing, by the respective storage node, the storage IO request for the storage object while avoiding performing internode communications with another storage node from among the first storage node and the second storage node in the highly available active-active clustered system.

In certain arrangements, the method further includes inspecting, by the respective storage node, the storage IO request to identify an entity associated with the storage object, and setting, by the respective storage node, a local lock on the identified entity while avoiding performing internode communications with the other storage node in the highly available active-active clustered system.

In certain arrangements, the storage IO request is a write IO request, and the method further incudes, having set the local lock on the entity of the storage object, allocating, by the respective storage node, space for a journal from a directly accessible buffer, and writing page reference or description information pertaining to the write IO request to the journal.

In certain arrangements, the method further includes sending, by the respective storage node, an acknowledgement message to a host computer that issued the write IO request, and releasing the local lock on the entity associated with the storage object.

In certain arrangements, the storage IO request is a read IO request, and the method further includes, having set the local lock on the entity of the storage object, reading, by the respective storage object, data corresponding to the entity associated with the storage object.

In certain arrangements, the method further includes sending, by the respective storage node, an acknowledgement message to a host computer that issued the read IO request, and releasing the local lock on the entity associated with the storage object.

In certain arrangements, the method further includes receiving a second storage IO request for a second storage object at the respective storage node, determining that the respective storage node is not the current owner of the second storage object, and, having determined that the respective storage node is not the current owner of the second storage object, engaging in internode communications with another storage node from among the first storage node and the second storage node to perform one of (i) obtaining a lock on an entity of the second storage object after transferring ownership of the second storage object from the other storage node to the respective storage node, and (ii) obtaining the lock on the entity of the second storage object without transferring the ownership of the second storage object.

In certain arrangements, the respective storage node and the other storage node correspond to peer storage nodes in the highly available active-active clustered system, the respective storage node has allocated space for a first journal, and the other storage node has allocated space for a second journal. The method further includes performing one or more of updating and synchronizing page reference or description information pertaining to outstanding writes to the second storage object stored in the first journal and the second journal. The page reference or description information includes, for each of one or more storage IO operations performed on the second storage object, a transaction identifier (ID) that has (i) a first sequence ID identifying a first peer storage node in the highly available active-active clustered system as the current owner of the second storage object that performed a respective storage IO operation on the second storage object, and (ii) a second sequence ID identifying a second peer storage node in the highly available active-active clustered system that performed an immediately prior storage IO operation on the second storage object.

In certain embodiments, a highly available active-active clustered system includes at least two storage nodes communicably connected to one another, and each respective storage node from among the at least two storage nodes includes a memory, and processing circuitry configured to execute program instructions out of the memory to receive a storage IO request for a storage object and determine that the respective storage node is a current owner of the storage object. Ownership of the storage object provides an indication of an affinity of the storage object to the respective storage node. The processing circuitry is further configured to execute the program instructions out of the memory, having determined that the respective storage node is the current owner of the storage object, to execute the storage IO request for the storage object while avoiding performing internode communications with another storage node from among the at least two storage nodes in the highly available active-active clustered system.

In certain arrangements, the processing circuitry is further configured to execute the program instructions out of the memory to inspect the storage IO request to identify an entity associated with the storage object, and to set a local lock on the identified entity while avoiding performing internode communications with the other storage node in the highly available active-active clustered system.

In certain arrangements, the storage IO request is a write IO request, and the processing circuitry is further configured to execute the program instructions out of the memory, having set the local lock on the entity of the storage object, to allocate space for a journal from a directly accessible buffer, and to write page reference or description information pertaining to the write IO request to the journal.

In certain arrangements, the processing circuitry is further configured to execute the program instructions out of the memory to send an acknowledgement message to a host computer that issued the write IO request and release the local lock on the entity associated with the storage object.

In certain arrangements, the storage IO request is a read IO request, and the processing circuitry is further configured to execute the program instructions out of the memory, having set the local lock on the entity of the storage object, to read data corresponding to the entity associated with the storage object.

In certain arrangements, the processing circuitry is further configured to execute the program instructions out of the memory to send an acknowledgement message with the read data to a host computer that issued the read IO request and release the local lock on the entity associated with the storage object.

In certain arrangements, the processing circuitry is further configured to execute the program instructions out of the memory to receive a second storage IO request for a second storage object, to determine that the respective storage node is not the current owner of the second storage object, and, having determined that the respective storage node is not the current owner of the second storage object, to engage in internode communications with the other storage node from among the at least two storage nodes to perform one of (i) obtaining a lock on an entity of the second storage object after transferring ownership of the second storage object from the other storage node to the respective storage node, and (ii) obtaining the lock on the entity of the second storage object without transferring the ownership of the second storage object.

In certain arrangements, the respective storage node and the other storage node correspond to peer storage nodes in the highly available active-active clustered system, the respective storage node has allocated space for a first journal, and the other storage node has allocated space for a second journal. The processing circuitry is further configured to execute the program instructions out of the memory to perform one or more of updating and synchronizing page reference or description information pertaining to outstanding writes to the second storage object stored in the first journal and the second journal. The page reference or description information includes, for each of one or more storage IO operations performed on the second storage object, a transaction identifier (ID) that has (i) a first sequence ID identifying a first peer storage node in the highly available active-active clustered system as the current owner of the second storage object that performed a respective storage IO operation on the second storage object, and (ii) a second sequence ID identifying a second peer storage node in the highly available active-active clustered system that performed an immediately prior storage IO operation on the second storage object.

In certain embodiments, a computer program product includes a set of non-transitory, computer-readable media having instructions that, when executed by processing circuitry of a respective storage node from among a first storage node and a second storage node communicably connected to the first storage node in a highly available active-active clustered system, cause the processing circuitry to perform a method that includes receiving a storage IO request for a storage object at the respective storage node, and determining that the respective storage node is a current owner of the storage object, in which ownership of the storage object provides an indication of an affinity of the storage object to the respective storage node. The method further includes, having determined that the respective storage node is the current owner of the storage object, executing, by the respective storage node, the storage IO request for the storage object while avoiding performing internode communications with another storage node from among the first storage node and the second storage node in the highly available active-active clustered system.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 1b is a block diagram of the active-active clustered system in the data storage environment of FIG. 1a;

FIG. 3 is a flow diagram of an exemplary method of executing, by a storage node in an active-active clustered system, a storage IO request for a storage object that has affinity to the storage node.

DETAILED DESCRIPTION

Techniques are disclosed herein for optimizing write input/output (IO) bandwidth and latency in an active-active clustered system using storage object affinity to a single storage node. The active-active clustered system can include at least a primary storage node and a secondary storage node that maintain their own journals. The respective journals can be directly accessible to both of the primary and secondary storage nodes. The journals can be synchronized for each page or entity of a storage object when a storage IO request is issued to a storage node to which the storage object does not have affinity. Such synchronization can be performed in the framework of acquiring a lock on the entity of the storage object during internode communications. To facilitate recovery from a disaster, data loss, and/or data corruption, transaction identifiers (IDs) associated with storage IO operations can be employed to facilitate identification of the most up-to-date page reference or description information for a given data or metadata page of a storage object. Host computers connected to the active-active clustered system can be configured to support a smart-routing protocol, such as the Asymmetric Logical Unit Assignment (ALUA) protocol or any other suitable protocol. Such a smart-routing protocol can be configured to permit storage IO requests for a particular storage object to be routed (e.g., most of the time) to the same storage node.

Figure 1A:
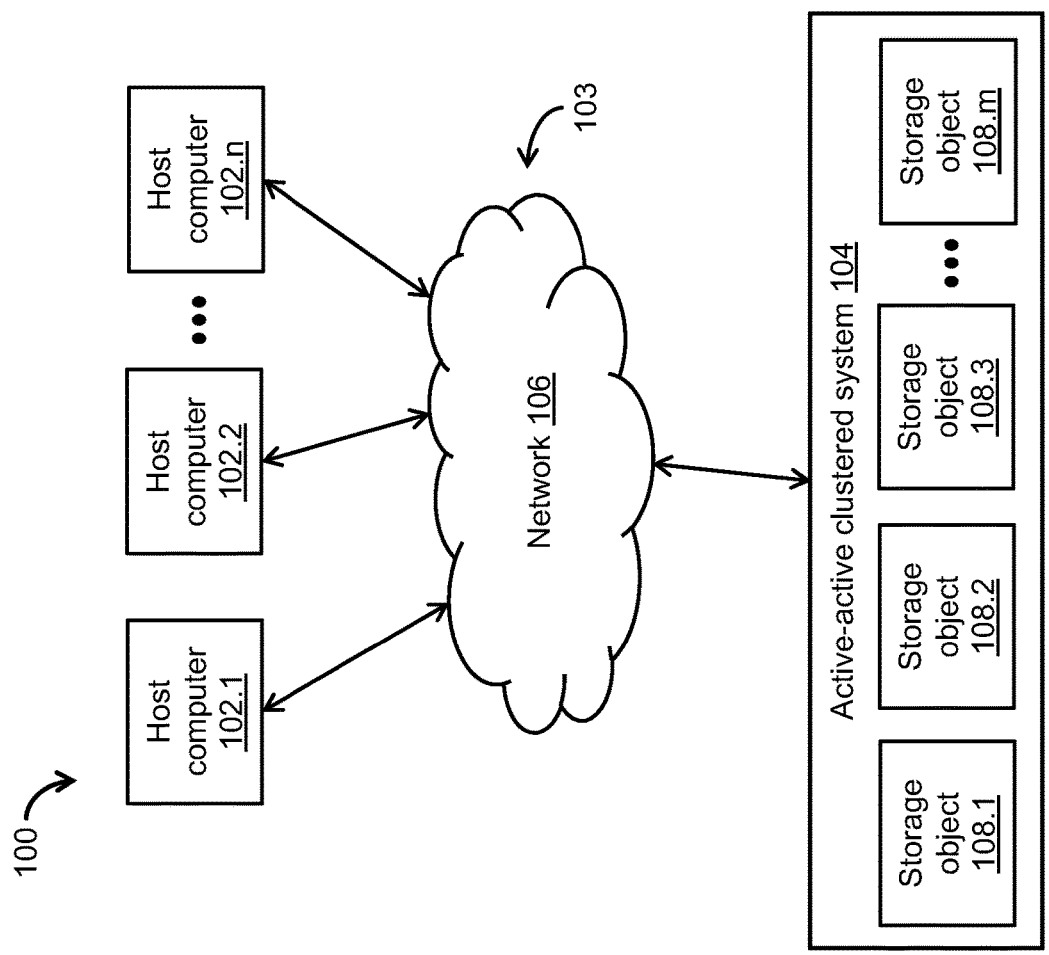
FIG. 1a is a block diagram of an exemplary data storage environment, in which techniques can be practiced for optimizing write input/output (IO) bandwidth and latency in an active-active clustered system using storage object affinity to a single storage node.

FIG. 1a depicts an illustrative embodiment of an exemplary data storage environment 100, in which techniques can be practiced for optimizing write IO bandwidth and latency in an active-active clustered system using storage object affinity to a single storage node. As shown in FIG. 1a, the data storage environment 100 can include a plurality of host computers 102.1, 102.2, . . . , 102.n, an active-active data storage system (also referred to herein as the "active-active clustered system") 104, and a communications medium 103 that includes at least one network 106. For example, each of the plurality of host computers 102.1, . . . , 102.n can be configured as a web server computer, a file server computer, an email server computer, an enterprise server computer, and/or any other suitable client/server computer or computerized device. The plurality of host computers 102.1, . . . , 102.n can be configured to provide, over the network 106, storage input/output (IO) requests (e.g., small computer system interface (SCSI) commands, network file system (NFS) commands) to the active-active clustered system 104. Such storage IO requests (e.g., write IO requests, read IO requests) can direct a data storage processor(s) (also referred to herein as a "data storage node(s)" or "storage node(s)") to write or read data blocks, data pages, data files, or any other suitable data elements to/from volumes (VOLs), logical units (LUs), file systems, and/or any other suitable storage objects, such as storage objects 108.1, 108.2, 108.3, . . . , 108.m maintained in association with the active-active clustered system 104.

The communications medium 103 can be configured to interconnect the plurality of host computers 102.1, . . . , 102.n and the data storage nodes of the active-active clustered system 104 to enable them to communicate and exchange data and/or control signaling. As shown in FIG. 1a, the communications medium 103 can be illustrated as a "cloud" to represent different communications topologies such as a backbone topology, a hub-and-spoke topology, a loop topology, an irregular topology, and so on, or any suitable combination thereof. As such, the communications medium 103 can include copper-based data communications devices and cabling, fiber optic-based communications devices and cabling, wireless communications devices, and so on, or any suitable combination thereof. Further, the communications medium 103 can be configured to support storage area network (SAN) communications, network attached storage (NAS) communications, local area network (LAN) communications, metropolitan area network (MAN) communications, wide area network (WAN) communications, wireless communications, distributed infrastructure communications, and/or any other suitable communications.

Figure 1B:
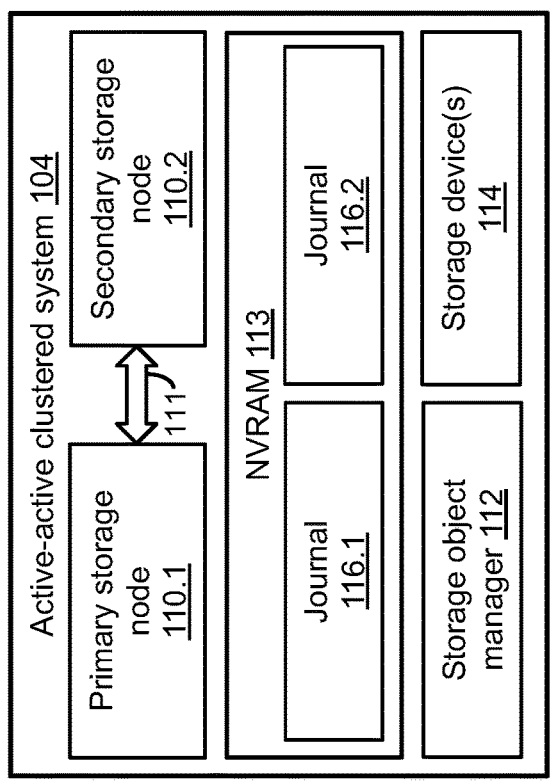

FIG. 1b depicts a detailed view of the active-active clustered system 104 of FIG. 1a. As employed herein, the term "active-active clustered system" refers to a highly available data storage system, in which multiple data storage nodes simultaneously have read-write IO access to the same storage objects (e.g., volumes (VOLs), logical units (LUs), file systems). As shown in FIG. 1b, the active-active clustered system 104 can include at least two storage processors ("storage nodes") for high availability, namely, a primary storage node 110.1 and a secondary storage node 110.2, which is communicably connected to the primary storage node 110.1 by a communication path(s) 111. For example, the primary storage node 110.1 can receive storage IO requests from the respective host computers 102.1, . . . , 102.n over the network 106. In response to the storage IO requests, the primary storage node 110.1 can perform storage IO operations (e.g., read-write IO operations) to write/read data blocks, data pages, data files, or any other suitable data elements to/from one or more of the plurality of storage objects 108.1, . . . , 108.m. Further, at least at intervals, the primary storage node 110.1 can update and/or synchronize page reference or description information pertaining to read-write IO operations maintained in a log or journal 116.1 by the primary storage node 110.1 with corresponding page reference or description information maintained in a log or journal 116.2 by the secondary storage node 110.2. In the event of a failure of the primary storage node 110.1 or at any other suitable time, the secondary storage node 110.2 can assume the role and/or duties of the primary storage node 110.1 with regard to the handling of storage IO requests, providing high availability within the active-active clustered system 104.

As further shown in FIG. 1b, the journals 116.1, 116.2 can be maintained in a non-volatile random-access memory (NVRAM) 113. In certain implementations, the NVM Express (NVMe) interface specification or any other suitable interface specification can be employed for accessing non-volatile storage media of the NVRAM 113. The NVRAM 113 can be configured with multiple ports to allow the primary storage node 110.1 and the secondary storage node 110.2 to have direct access to the NVRAM 113, including direct access to both of the journals 116.1, 116.2. In certain implementations, each journal 116.1, 116.2 can be implemented as a ring buffer, a linear buffer, a binary tree (e.g., a B-tree), or any other suitable memory structure. The active-active clustered system 104 can include a storage object manager 112 and one or more storage devices 114. The storage object manager 112 can be configured to perform tasks related to the transfer of ownership of the respective storage objects 108.1, . . . , 108.m between at least the primary storage node 110.1 and the secondary storage node 110.2. The storage devices 114 can include one or more of a non-volatile random-access memory (NVRAM), a solid-state drive (SSD), a hard drive, a flash memory, and/or any other suitable storage device(s) for storing storage object data (also referred to herein as "user data") and/or metadata.

Figure 2B:
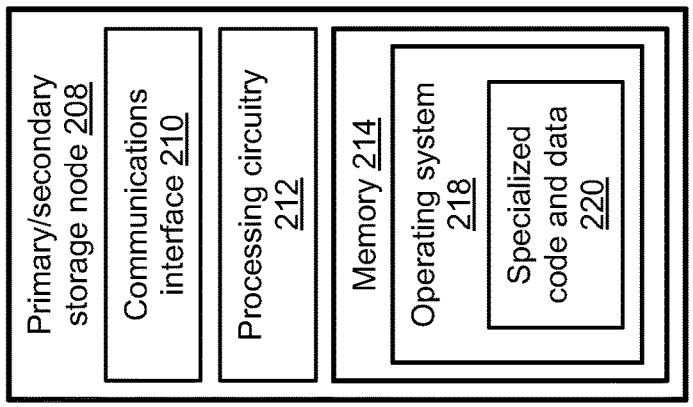
FIG. 2b is a block diagram of an exemplary primary or secondary storage processor (or storage node) included in the active-active clustered system of FIG. 1b.
Figure 2A:
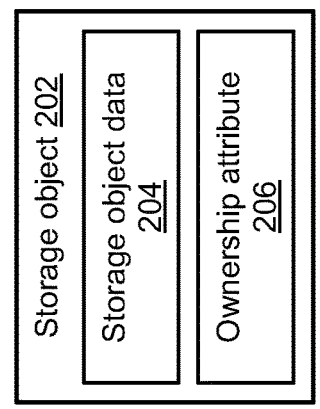
FIG. 2a is a block diagram of an exemplary storage object upon which the techniques can be practiced in the active-active clustered system of FIG. 1b.

FIG. 2a depicts an implementation of an exemplary storage object 202 (e.g., a volume (VOL), a logical unit (LU), a file system). It is noted that each of the plurality of storage objects 108.1, . . . , 108.m can be implemented like the storage object 202 of FIG. 2a. As shown in FIG. 2a, the storage object 202 can incorporate storage object data 204 and an ownership attribute 206. In certain implementations, the ownership attribute 206 can be a global attribute. The storage object data 204 can include any suitable data, such as metadata (e.g., i-node metadata, directory metadata, mapping metadata) and/or user data. The ownership attribute 206 can include a number, a string, an alphanumerical string, and/or any other suitable designation(s) for identifying a data storage node (e.g., the primary storage node 110.1, the secondary storage node 110.2) as the current owner of the storage object 202. In certain implementations, each of the plurality of storage objects 108.1, . . . , 108.m can have only one owner at any given time. It is noted that a data storage node that is the owner of a storage object(s) generally has up-to-date page reference or description information pertaining to outstanding writes (if any) to the storage object(s) stored in its journal.

FIG. 2b depicts an exemplary implementation of a primary or secondary storage node (also referred to herein as a "peer storage node") 208. It is noted that each of the primary storage node 110.1 and the secondary storage node 110.2 of the active-active clustered system 104 can be implemented like the peer storage node 208 of FIG. 2b. As shown in FIG. 2b, the peer storage node 208 can include a communications interface 210, processing circuitry 212, and a memory 214. The communications interface 210 can include one or more of an InfiniBand interface, an Ethernet interface, an IEEE 802.11x (WiFi) interface, a Bluetooth interface, and/or any other suitable communications interface. The communications interface 210 can further include SCSI target adapters, network interface adapters, and/or any other suitable adapters for converting electronic, optical, and/or wireless signals received over the network 106 to a form suitable for use by the processing circuitry 212.

The memory 214 can include persistent memory (e.g., flash memory, magnetic memory) and/or non-persistent memory (e.g., dynamic random-access memory (DRAM), static random-access memory (SRAM)). The memory 214 can also store a variety of software constructs realized in the form of specialized code and data 220 (e.g., program instructions) that can be executed by the processing circuitry 212 to carry out the techniques and/or methods disclosed herein. As shown in FIG. 2b, the memory 214 can further include an operating system 218 (e.g., a Linux operating system (OS), a Unix OS, a Windows OS).

The processing circuitry 212 can include one or more physical storage processors and/or engines configured to execute the specialized code and data 220, as well as data movers, director boards, blades, IO modules, storage drive controllers, switches, and/or any other suitable computer hardware or combination thereof. For example, the processing circuitry 212 can execute the specialized code and data 220 as program instructions out of the memory 214, process storage IO requests (e.g., write IO requests, read IO requests) issued by the respective host computers 102.1, . . . , 102.n, and/or store user data and/or metadata on the storage device(s) 114 within the data storage environment 100, such as a clustered RAID environment. It is noted that the peer storage node 208 can include a keyboard, a mouse, and/or any other suitable IO device(s), an uninterruptable power supply (UPS), and/or any other suitable storage node component(s).

In the context of the processing circuitry 212 being implemented using one or more processors executing the specialized code and data 220, a computer program product can be configured to deliver all or a portion of the specialized code and data 220 to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques and/or methods disclosed herein.

During operation, the primary storage node 110.1 of the active-active clustered system 104 can receive a storage IO request for a storage object from a host computer and determine whether the storage object has affinity to it, based at least on the current ownership of the storage object. Once it is determined that the storage object has affinity to the primary storage node 110.1 (based at least on the primary storage node 110.1 being the current owner of the storage object), the primary storage node 110.1 can independently set a local lock on an entity associated with the storage object, without engaging in internode communications with the secondary storage node 110.2 of the active-active clustered system 104. The primary storage node 110.1 can allocate space for the journal 116.1 from a directly accessible buffer and execute the storage IO request, writing page reference or description information related to the storage IO request to the journal 116.1. Once the page reference or description information for the storage IO request is written to the journal 116.1, the primary storage node 110.1 can send an acknowledgement to the host computer and release the lock on the entity associated with the storage object. By deferring internode communications between the primary storage node 110.1 and the secondary storage node 110.2 when storage IO requests for storage objects are received at the storage node to which the storage objects have affinity, latency and cycles per byte (CPB) processing in the active-active clustered system 104 can be reduced, and storage IO operations per second (IOPS) can be increased.

The disclosed techniques for optimizing write IO bandwidth and latency in an active-active clustered system using storage object affinity to a single storage node will be further understood with reference to the following illustrative examples, and FIGS. 1a, 1b, and 2a. In the following examples, each of the plurality of host computers 102.1, ..., 102.n (see FIG. 1a) is configured to support a smart-routing protocol, such as the Asymmetric Logical Unit Assignment (ALUA) protocol or any other suitable protocol. Such a smart-routing protocol can be configured to permit storage IO requests for a particular storage object to be routed (e.g., most of the time) to the same data storage node. In this regard, each of the host computers 102.1, ..., 102.n (and/or their associated networking infrastructure) can maintain a map configured to associate each of the storage objects 108.1, ..., 108.m with a corresponding data storage node (e.g., the primary storage node 110.1, the secondary storage node 110.2; see FIG. 1b). While accessing a particular storage object, the respective host computers 102.1, ..., 102.n (and/or their associated networking infrastructure) can use the map to identify the data storage node to which the storage object has affinity, and send storage IO requests (e.g., write IO requests, read IO requests) for the storage object only (or mostly) to the identified data storage node. It is noted that such use of the ALUA protocol or other suitable protocol can allow a data storage node that is the current owner of a storage object (e.g., the storage object 108.1, 108.2, ..., or 108.m) to receive most of the storage IO requests for the storage object.

In a first example, a write IO request is issued by one of the host computers 102.1, ..., 102.n to the primary storage node 110.1 (see FIG. 1b) of the active-active clustered system 104 for a storage object (e.g., the storage object 202; see FIG. 2a) that has affinity to the primary storage node 110.1. Upon receipt of the write IO request for the storage object 202 at the primary storage node 110.1, the primary storage node 110.1 determines whether it is the current owner of the storage object 202 by retrieving the ownership attribute 206 of the storage object 202, and inspecting the ownership attribute 206 to determine whether it includes a designation that identifies the primary storage node 110.1 as the current owner of the storage object 202. Having determined that it is the current owner of the storage object 202, the primary storage node 110.1 inspects the write IO request to identify an entity associated with the storage object 202. In certain implementations, such an entity can include a metadata page that maps a logical block address (LBA) provided in the write IO request to a corresponding physical block address (PBA) for the storage object 202. The primary storage node 110.1 can execute the write IO request based on such an entity by using the metadata page to retrieve the PBA for the storage object 202 and writing data to the PBA. In certain implementations, such an entity can correspond to an LBA provided in the write IO request. The primary storage node 110.1 can execute the write IO request based on such an entity by writing to the LBA. Because, in this first example, the primary storage node 110.1 is determined to be the current owner of the storage object 202, the primary storage node 110.1 is assumed to have up-to-date page reference or description information pertaining to outstanding writes (if any) to at least the storage object 202 stored in its journal 116.1, and is therefore capable of successfully executing the write IO request for the storage object 202. As employed herein, the term "outstanding writes" refers to data pertaining to a storage object that has been written to a journal of a data storage node, but has not been flushed from the journal to a storage device.

Once the entity associated with the storage object 202 is identified, the primary storage node 110.1 independently sets a local lock on the entity, without engaging in internode communications with the secondary storage node 110.2. As employed herein, the term "lock" refers to any suitable synchronization object (or variable) configured to control access to an entity of a storage object. In certain implementations, a data storage node can set such a lock by transitioning the lock from a first state to a second state. The first state of the lock can be configured to prevent the data storage node from accessing the entity associated with the storage object, while the second state of the lock can be configured to permit the data storage node to access the entity associated with the storage object. When the data storage node releases the lock, the data storage node can transition the lock from the second state to the first state. Having independently set the local lock on the entity associated with the storage object 202, the primary storage node 110.1 allocates space for the journal 116.1 from a directly accessible buffer and executes the write IO request for the storage object 202, writing page reference or description information pertaining to the write IO request to the journal 116.1. Once the page reference or description information for the write IO request is written to the journal 116.1 of the primary storage node 110.1, the primary storage node 110.1 sends an acknowledgement message to the host computer 102.1, 102.2, . . . , or 102.n that issued the write IO request and releases the lock on the entity associated with the storage object 202.

In a second example, a read IO request is issued by one of the host computers 102.1, . . . , 102.n to the primary storage node 110.1 (see FIG. 1b) for a storage object (e.g., the storage object 202; see FIG. 2a) that has affinity to the primary storage node 110.1. Having previously determined that it is the current owner of the storage object 202, the primary storage node 110.1 inspects the read IO request to identify an entity associated with the storage object 202. In certain implementations, such an entity can include a metadata page that maps an LBA provided in the read IO request to a corresponding PBA for the storage object 202, or the entity can correspond to an LBA provided in the read IO request. Once the entity associated with the storage object 202 is identified, the primary storage node 110.1 independently sets a local lock on the entity, without engaging in internode communications with the secondary storage node 110.2. Having independently set the local lock on the entity associated with the storage object 202, the primary storage node 110.1 reads data at the LBA (or PBA) associated with the storage object 202, sends an acknowledgement message with the read data to the host computer 102.1, 102.2, . . . , or 102.n that issued the read IO request, and releases the lock on the entity associated with the storage object 202.

In a third example, a write IO request is issued by one of the host computers 102.1, . . . , 102.n to the secondary storage node 110.2 (see FIG. 1b) of the active-active clustered system 104 for a storage object (e.g., the storage object 202; see FIG. 2a) that does not have affinity to the secondary storage node 110.2. Upon receipt of the write IO request for the storage object 202 at the secondary storage node 110.2, the secondary storage node 110.2 determines whether it is the current owner of the storage object 202 by retrieving the ownership attribute 206 of the storage object 202, and inspecting the ownership attribute 206 to determine whether it includes a designation that identifies the secondary storage node 110.2 as the current owner of the storage object 202. Having determined that it is not the current owner of the storage object 202, but, rather, the primary storage node 110.1 is the current owner, the secondary storage node 110.2 engages in internode communications with the primary storage node 110.1 to transfer ownership of the storage object 202 from the primary storage node 110.1 to the secondary storage node 110.2. In certain implementations, the secondary storage node 110.2 can engage in internode communications with the primary storage node 110.1 to transfer ownership of the storage object 202 after a predetermined number of consecutive storage IO requests for the storage object 202 (e.g., five (5) or any other suitable number) have been issued to the secondary storage node 110.2, or at any other suitable time. In certain implementations, the storage object manager 112 (see FIG. 1b) can facilitate the transfer of ownership of the storage object 202 by sending a request to the primary storage node 110.1 to relinquish its ownership of the storage object 202.

In response to the request to relinquish its ownership of the storage object 202, the primary storage node 110.1 can complete and/or acknowledge any pending host accesses to the storage object 202. Further, the primary storage node 110.1 can identify one or more locks associated with the storage object that are currently set, release the respective locks, and prevent any further access to the storage object 202 by processes running on the primary storage node 110.1. The primary storage node 110.1 can also send a message to the storage object manager 112 indicating that its ownership of the storage object 202 has been relinquished. In response to receiving the message from the primary storage node 110.1, the storage object manager 112 can send a change-of-ownership message to the primary storage node 110.1, the secondary storage node 110.2, and any other data storage node(s) in the active-active clustered system 104. In certain implementations, such a change-of-ownership message can include a first identifier that identifies the storage object 202, and a second identifier that identifies the secondary storage node 110.2 (or any other suitable data storage node in the active-active clustered system 104) as the new current owner of the storage object 202. Having received the change-of-ownership message from the storage object manager 112, the primary storage node 110.1, the secondary data storage node 110.2, and/or any other suitable data storage node(s) modify the ownership attribute 206 incorporated into their local copies of the storage object 202 to identify the secondary storage node 110.2 as the new current owner of the storage object 202.

In addition, the primary storage node 110.1 engages in internode communications with the secondary storage node 110.2 to update and/or synchronize page reference or description information stored in its journal 116.1 pertaining to outstanding writes to at least the storage object 202 (if any) with page reference or description information stored in the journal 116.2 of the secondary storage node 110.2. For example, the primary storage node 110.1 can perform such an update and/or synchronization after sending an acknowledgement message to the host computer 102.1, 102.2, . . . , or 102.n from which it received a storage IO request (e.g., a write IO request, a read IO request), which may have been issued concurrently with a storage IO request issued to the secondary storage node 110.2. In certain implementations, such page reference or description information can include, for each read or write of data to a storage object, a transaction identifier (ID) that has a pair of monotonically increasing sequence IDs, including a first sequence ID that identifies the current owner of the storage object (e.g., a data storage node "A") that performs a read-write IO operation on the storage object, and a second sequence ID that identifies a peer storage node that performed an immediately prior read-write IO operation (if any) on the storage object (e.g., a data storage node "B"). In certain implementations, for a particular read/write of data to the storage object by the data storage node "A," such a pair of monotonically increasing sequence IDs can be expressed, as follows:

$$A188:B\_null, \quad (1)$$

in which "A188" corresponds to a first sequence ID that identifies the current owner of the storage object (i.e., the data storage node "A") that performed a read-write IO operation on the storage object, and "B_null" corresponds to a second sequence ID that identifies the peer storage node (i.e., the data storage node "B") that performed an immediately prior read-write IO operation (if any) on the storage object. In expression (1) above, the second sequence ID is "null," which indicates that, in this case, no immediately prior read-write operation was actually performed on the storage object by the data storage node "B."

However, if ownership of the storage object is transferred from the data storage node "A" to the data storage node "B," for the next read/write of data to the storage object by the data storage node "B," the next pair of monotonically increasing sequence IDs can be expressed, as follows:

$$B437:A188, \quad (2)$$

in which "B437" corresponds to a first sequence ID that identifies the current owner of the storage object (i.e., the data storage node "B") that performed the read-write IO operation on the storage object, and "A188" corresponds to a second sequence ID that identifies the peer storage node (i.e., the data storage node "A") that performed the immediately prior read-write IO operation on the storage object. Expression (2) therefore indicates that the read-write IO operation previously performed on the storage object by the data storage node "A" (corresponding to sequence ID "A188") has been overwritten by the read-write IO operation performed on the storage object by the data storage node "B" (corresponding to sequence ID "B437"). Accordingly, the journal of the data storage node "B" now contains the most up-to-date page reference or description information pertaining to outstanding reads/writes to the storage object. It is noted that the first and second sequence IDs included in expressions (1) and (2) above are merely exemplary, and that any other suitable sequence IDs can be employed.

Having updated and/or synchronized the page reference or description information contained in the journal 116.2 of the secondary storage node 110.2 with the page reference or description information contained in the journal 116.1 of the primary storage node 110.1, the secondary storage node 110.2 inspects the write IO request to identify an entity (e.g., an LBA, a mapping of an LBA to a PBA) associated with the storage object 202, and independently sets a local lock on the entity, without engaging in any further internode communications with the primary storage node 110.1. Having independently set the local lock on the entity associated with the storage object 202, the secondary storage node 110.2 allocates space for the journal 116.2 from a directly accessible buffer, and executes the write IO request for the storage object 202, writing page reference or description information pertaining to the write IO request (including a transaction ID that includes a pair of monotonically increasing sequence IDs; see, e.g., expressions (1) and (2) above) to the journal 116.2. Once the page reference or description information for the write IO request is written to the journal 116.2 of the secondary storage node 110.2, the secondary storage node 110.2 sends an acknowledgement message to the host computer 102.1, 102.2, . . . , or 102.n that issued the write IO request and releases the lock on the entity associated with the storage object 202. It is noted that, if the ownership of the storage object 202 is not transferred from the primary storage node 110.1 to the secondary storage node 110.2, then the secondary storage node 110.2 can engage in internode communications with the primary storage node 110.1 to acquire or otherwise obtain the lock on the entity associated with the storage object 202, thereby preventing concurrent accesses to the entity by multiple storage nodes.

In a fourth example, a read IO request is issued by one of the host computers 102.1, . . . , 102.n to the secondary storage node 110.2 (see FIG. 1b) for a storage object (e.g., the storage object 202; see FIG. 2a) that does not have affinity to the secondary storage node 110.2. Upon receipt of the read IO request for the storage object 202 at the secondary storage node 110.2, the secondary storage node 110.2 determines whether it is the current owner of the storage object 202 by retrieving the ownership attribute 206 of the storage object 202 and determining whether it includes a designation that identifies the secondary storage node 110.2 as the current owner of the storage object 202. Having determined that it is not the current owner of the storage object 202, but, rather, the primary storage node 110.1 is the current owner, the secondary storage node 110.2 may engage in internode communications with the primary storage node 110.1 (and/or the storage object manager 112) to transfer ownership of the storage object 202 from the primary storage node 110.1 to the secondary storage node 110.2, as described herein with reference to the foregoing third example.

In addition, the primary storage node 110.1 engages in internode communications with the secondary storage node 110.2 to update and/or synchronize page reference or description information stored in its journal 116.1 pertaining to outstanding writes to at least the storage object 202 (if any) with page reference or description information stored in the journal 116.2 of the secondary storage node 110.2. For example, the primary storage node 110.1 can perform such an update and/or synchronization after sending an acknowledgement message to the host computer 102.1, 102.2, . . . , or 102.n from which it received a storage IO request (e.g., a write IO request, a read IO request), which may have been issued concurrently with a storage IO request issued to the secondary storage node 110.2.

Having updated and/or synchronized the page reference or description information contained in the journal 116.2 of the secondary storage node 110.2 with the page reference or description information contained in the journal 116.1 of the primary storage node 110.1, the secondary storage node 110.2 inspects the read IO request to identify an entity (e.g., an LBA, a mapping of an LBA to a PBA) associated with the storage object 202, and independently sets a local lock on the entity, without engaging in any further internode communications with the primary storage node 110.1. Having independently set the local lock on the entity associated with the storage object 202, the secondary storage node 110.2 reads data at the LBA (or PBA) associated with the storage object 202, sends an acknowledgement message with the read data to the host computer 102.1, 102.2, . . . , or 102.n that issued the read IO request, and releases the lock on the entity associated with the storage object 202. As described herein with reference to the third example, if the ownership of the storage object 202 is not transferred from the primary storage node 110.1 to the secondary storage node 110.2, then the secondary storage node 110.2 can engage in internode communications with the primary storage node 110.1 to acquire or otherwise obtain the lock on the entity associated with the storage object 202, thereby preventing concurrent accesses to the entity by multiple storage nodes.

As further described herein, page reference or description information written to the journals 116.1, 116.2 of the primary and secondary storage nodes 110.1, 110.2, respectively, can include, for each read or write of data to a storage object, a transaction identifier (ID) that has a pair of monotonically increasing sequence IDs, including a first sequence ID that identifies the current owner of the storage object that performed a read-write IO operation on the storage object, and a second sequence ID that identifies a peer storage node that performed an immediately prior read-write IO operation (if any) on the storage object. During a recovery from a disaster, data loss, and/or data corruption, such transaction IDs can be useful in identifying the most up-to-date page reference or description information stored among a plurality of data storage nodes for a given data or metadata page of a storage object. For example, with reference to the active-active clustered system 104 of FIG. 1b, the most up-to-date page reference or description information for a given data or metadata page of a storage object may be found in either the journal 116.1 or the journal 116.2, based on one or more transaction IDs associated with read-write IO operations performed on the storage object.

An exemplary method of executing, by a data storage node in an active-active clustered system, a storage IO request (e.g., a write IO request, a read IO request) for a storage object that has affinity to the data storage node is described below with reference to FIG. 3. This exemplary method of executing a storage IO request can be performed in an active-active clustered system that includes at least a first storage node and a second storage node communicably connected to the first storage node for high availability. As depicted in block 302, a storage IO request for a storage object is received at a respective storage node from among a first storage node and a second storage node in a highly available active-active clustered system. As depicted in block 304, the respective storage node is determined to be the current owner of the storage object, such ownership of the storage object providing an indication of the storage object's affinity to the respective storage node. As depicted in block 306, having determined that the respective storage node is the current owner of the storage object, the storage IO request for the storage object is executed, by the respective storage node, while avoiding performing internode communications with another storage node from among the first storage node and the second storage node in the highly available active-active clustered system.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a file system, object storage, a virtualized device, a logical unit (LU), a logical unit number (LUN), a logical volume, a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by address. A physical storage unit may used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of executing a storage input/output (IO) request for a storage object that has affinity to a storage node, comprising:
   receiving a storage IO request for a storage object at a respective storage node from among a first storage node and a second storage node in an active-active clustered system, the second storage node being communicably connected to the first storage node;
   determining that the respective storage node is a current owner of the storage object, an ownership of the storage object providing an indication of an affinity of the storage object to the respective storage node;
   having determined that the respective storage node is the current owner of the storage object, executing, by the respective storage node, the storage IO request for the storage object while avoiding performing internode communications with another storage node from among the first storage node and the second storage node in the active-active clustered system;
   inspecting, by the respective storage node, the storage IO request to identify an entity associated with the storage object; and
   setting, by the respective storage node, a local lock on the identified entity while avoiding performing internode communications with the other storage node in the active-active clustered system.

2. The method of claim 1 wherein the storage IO request is a write IO request, and wherein the method further comprises:
   having set the local lock on the entity of the storage object, allocating, by the respective storage node, space for a journal from a directly accessible buffer; and
   writing page reference or description information pertaining to the write IO request to the journal.

3. The method of claim 2 further comprising:
sending, by the respective storage node, an acknowledgement message to a host computer that issued the write IO request; and
releasing the local lock on the entity associated with the storage object.

4. The method of claim 1 wherein the storage IO request is a read IO request, and wherein the method further comprises:
having set the local lock on the entity of the storage object, reading, by the respective storage node, data corresponding to the entity associated with the storage object.

5. The method of claim 4 further comprising:
sending, by the respective storage node, an acknowledgement message to a host computer that issued the read IO request; and
releasing the local lock on the entity associated with the storage object.

6. The method of claim 1 further comprising:
receiving a second storage IO request for a second storage object at the respective storage node;
determining that the respective storage node is not the current owner of the second storage object; and
having determined that the respective storage node is not the current owner of the second storage object, engaging in internode communications with another storage node from among the first storage node and the second storage node to perform one of (i) obtaining a lock on an entity of the second storage object after transferring ownership of the second storage object from the other storage node to the respective storage node, and (ii) obtaining the lock on the entity of the second storage object without transferring the ownership of the second storage object.

7. The method of claim 6 wherein the respective storage node and the other storage node correspond to peer storage nodes in the active-active clustered system, wherein the respective storage node has allocated space for a first journal, wherein the other storage node has allocated space for a second journal, and wherein the method further comprises:
performing one or more of updating and synchronizing page reference or description information pertaining to outstanding writes to at least the second storage object stored in the first journal and the second journal, the page reference or description information including, for each of one or more storage IO operations performed on the second storage object, a transaction identifier (ID) that has (i) a first sequence ID identifying a first peer storage node in the active-active clustered system as the current owner of the second storage object that performed a respective storage IO operation on the second storage object, and (ii) a second sequence ID identifying a second peer storage node in the active-active clustered system that performed an immediately prior storage IO operation on the second storage object.

8. An active-active clustered system including at least two storage nodes communicably connected to one another, each respective storage node from among the at least two storage nodes comprising:
a memory; and
processing circuitry configured to execute program instructions out of the memory to:
receive a storage IO request for a storage object;
determine that the respective storage node is a current owner of the storage object, an ownership of the storage object providing an indication of an affinity of the storage object to the respective storage node;
having determined that the respective storage node is the current owner of the storage object, execute the storage IO request for the storage object while avoiding performing internode communications with another storage node from among the at least two storage nodes in the active-active clustered system;
inspect the storage IO request to identify an entity associated with the storage object; and
set a local lock on the identified entity while avoiding performing internode communications with the other storage node in the active-active clustered system.

9. The system of claim 8 wherein the storage IO request is a write IO request, and wherein the processing circuitry of the respective storage node is further configured to execute the program instructions out of the memory to:
having set the local lock on the entity of the storage object, allocate space for a journal from a directly accessible buffer; and
write page reference or description information pertaining to the write IO request to the journal.

10. The system of claim 9 wherein the processing circuitry of the respective storage node is further configured to execute the program instructions out of the memory to:
send an acknowledgement message to a host computer that issued the write IO request; and
release the local lock on the entity associated with the storage object.

11. The system of claim 8 wherein the storage IO request is a read IO request, and wherein the processing circuitry of the respective storage node is further configured to execute the program instructions out of the memory to:
having set the local lock on the entity of the storage object, read data corresponding to the entity associated with the storage object.

12. The system of claim 11 wherein the processing circuitry of the respective storage node is further configured to execute the program instructions out of the memory to:
send an acknowledgement message with the read data to a host computer that issued the read IO request; and
release the local lock on the entity associated with the storage object.

13. The system of claim 8 wherein the processing circuitry of the respective storage node is further configured to execute the program instructions out of the memory to:
receive a second storage IO request for a second storage object;
determine that the respective storage node is not the current owner of the second storage object; and
having determined that the respective storage node is not the current owner of the second storage object, engage in internode communications with the other storage node from among the at least two storage nodes to perform one of (i) obtaining a lock on an entity of the second storage object after transferring ownership of the second storage object from the other storage node to the respective storage node, and (ii) obtaining the lock on the entity of the second storage object without transferring the ownership of the second storage object.

14. The system of claim 13 wherein the respective storage node and the other storage node correspond to peer storage nodes in the active-active clustered system, wherein the respective storage node has allocated space for a first journal, wherein the other storage node has allocated space for a second journal, and wherein the processing circuitry of the respective storage node is further configured to execute the program instructions out of the memory to:

perform one or more of updating and synchronizing page reference or description information pertaining to outstanding writes to the second storage object stored in the first journal and the second journal, the PA reference or description information including, for each of one or more storage IO operations performed on the second storage object, a transaction identifier (ID) that has (i) a first sequence ID identifying a first peer storage node in the active-active clustered system as the current owner of the second storage object that performed a respective storage IO operation on the second storage object, and (ii) a second sequence ID identifying a second peer storage node in the active-active clustered system that performed an immediately prior storage IO operation on the second storage object.

15. A computer program product including a set of non-transitory, computer-readable media having instructions that, when executed by processing circuitry of a respective storage node from among a first storage node and a second storage node communicably connected to the first storage node in an active-active clustered system, cause the processing circuitry to perform a method comprising:

receiving a storage IO request for a storage object at the respective storage node;

determining that the respective storage node is a current owner of the storage object, an ownership of the storage object providing an indication of an affinity of the storage object to the respective storage node;

having determined that the respective storage node is the current owner of the storage object, executing, by the respective storage node, the storage IO request for the storage object while avoiding performing internode communications with another storage node from among the first storage node and the second storage node in the active-active clustered system;

inspecting, by the respective storage node, the storage IO request to identify an entity associated with the storage object; and setting, by the respective storage node, a local lock on the identified entity while avoiding performing internode communications with the other storage node in the active-active clustered system.

16. The computer program product of claim 15 wherein the method further comprises:

having set the local lock on the entity of the storage object, allocating, by the respective storage node, space for a journal from a directly accessible buffer; and writing page reference or description information pertaining to the storage IO request to the journal.

17. The computer program product of claim 16 wherein the method further comprises:

sending, by the respective storage node, an acknowledgement message to a host computer that issued the storage IO request; and releasing the local lock on the entity associated with the storage object.

* * * * *